Nov. 4, 1958 — C. LORENZEN — 2,858,863
FRUIT CUTTING APPARATUS WITH SIZE COMPENSATION
Filed Sept. 28, 1955 — 4 Sheets-Sheet 1

INVENTOR.
COBY LORENZEN
BY
Lippincott & Smith
ATTORNEYS

INVENTOR.
COBY LORENZEN
BY
Lippincott & Smith
ATTORNEYS

Nov. 4, 1958 C. LORENZEN 2,858,863
FRUIT CUTTING APPARATUS WITH SIZE COMPENSATION
Filed Sept. 28, 1955 4 Sheets-Sheet 3

INVENTOR.
COBY LORENZEN
BY
Lippincott & Smith
ATTORNEYS

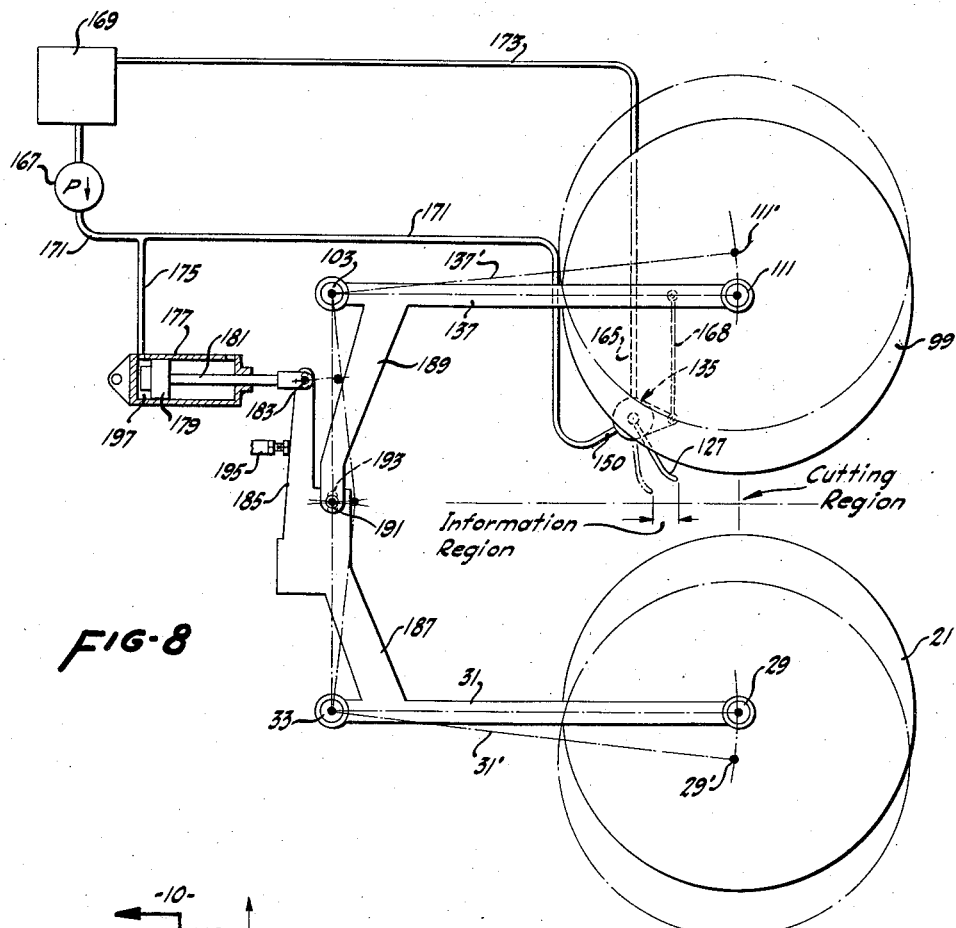
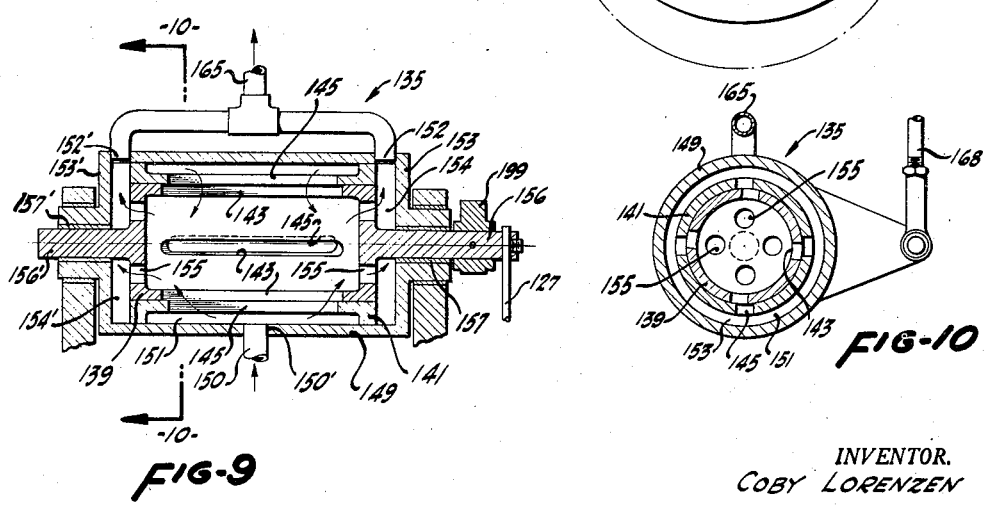

United States Patent Office 2,858,863
Patented Nov. 4, 1958

2,858,863

FRUIT CUTTING APPARATUS WITH SIZE COMPENSATION

Coby Lorenzen, Davis, Calif., assignor to The Regents of the University of California, Berkeley, Calif., a corporation of California Application September 28, 1955, Serial No. 537,242

25 Claims. (Cl. 146—72)

This invention relates to fruit cutting apparatus for use in the fruit packing and drying industry. The apparatus to be described is uniquely adapted for cutting fruit subject to size and weight variations, and particularly those of the drupaceous variety, into halves preparatory to drying.

Prior art mechanisms and devices heretofore used and marketed for the cutting or slicing of fruit into halves, while generally appearing practical from the theoretical standpoint, are found to be slow in their operation and they fail readily to accommodate themselves to varying size fruits supplied to the slicing machine. Devices of the type known in the art have generally failed to meet the needs of the industry and particularly so with respect to rapid operation. The prior art devices have generally been of a variety such that the fruit, although actually divided into two parts, which may or may not be of approximately equal size, is generally subject to uneven or ragged cutting. This is due for the most part, to the fact that in the cutting operation the slicing or cutting mechanism for dividing the fruit is caused to make more than a single turn circumferentially the fruit. The result is that instead of providing a smooth and uniform cutting or severing of the fruit into two like-size parts there is a tendency in many cases to leave short shavings on one or the other or both of the cut components. These shavings, if dried always adhere to the fruit as dried out and useless parts, their mere presence being sufficient to cause the fruit in its classification to be down-graded from the so-called perfect or "Grade A" variety. Accordingly, improving the cutting operation results in more uniform parts which have a substantially improved sales appeal and, naturally sell better in the market as well as to bring higher prices.

Also, in the prior art devices it has been difficult with forms of mechanisms available, if not completely unsatisfactory from the practical standpoint, to effect a rapid cutting of the fruit components into halves in those instances where the components supplied in sequence to the cutting elements differ from one another in size and weight. In many instances mechanisms heretofore known which were intended for dividing the fruit components into halves actually divide the fruit into pieces of unequal size. Occasionally the division is such that the parts are so far from being equal in size that the pit or stone may even remain completely embedded in one part or the other so that its removal is extremely difficult, costly, time consuming and, furthermore, results in a most imperfect variety of final product.

The present invention aims to provide a machine wherein regardless of the size of the fruit to be divided compensation is made for size and weight variance from piece to piece to an extent such that in the cutting operation the fruit is divided almost, if not precisely, into equal size parts as it is cut. The compensation is effected in a way to shift the position of the fruit components, as may be necessary and, dependent upon size, relative to the cutting instrumentality just prior to the time when the individual fruit sections are placed within the region of the fruit cutting elements.

To bring about this control the fruit for cutting is supplied along a conveyor mechanism of suitable characteristics and fed to the cutting region. As the fruit enters the cutting region it is held from points both above and below the cutting plane. The lower support, in accordance with the invention to be described, is the conveyor mechanism upon which the fruit is travelled. The upper support consists of a fruit gripping component of characteristics similar to those used to hold the fruit on the conveyor mechanism and which components attach themselves to the fruit immediately upon it being brought within the general region of the cutting blades.

Suitable feeler mechanisms for testing the fruit size immediately prior to the cutting operation are provided. These feeler elements, in turn, control the adjustment and separation of the fruit gripping surfaces with respect to each other—it being borne in mind that prior to reaching the general region of cutting or slicing the fruit preferably rests merely by the effect of gravity upon the fruit supports secured to the conveyor mechanism. The fruit cutting mechanism is in the form of blades or knives arranged in a way such that they substantially meet at their outer points. Each blade is arcuately recessed toward its inner edge. The cutting blades are supported and spring-biased to meet at their outer points and there to form substantially into V-shape with the fruit on the conveyor mechanism adapted to enter the V-shaped region of the cutting blades from the open end of the V and to move toward the closed point or apex of the V. Arcuate shaping of the cutting blades is such that as the fruit tends to move toward the point of the V the cutting edges first slice through the skin of the fruit from opposite sides and penetrate through the fleshy part of the fruit toward the pit or stone. Penetration of the curved edges of the blades with the fruit moving toward the closed end of the V soon causes the normally abutting points of the cutting blades to separate. Spring pressure exerted on the blades normally to hold them in substantially V-shaped arrangement tends to press the pointed edge of the blade toward the inner section of the fruit so that as the fruit is moved relative to the blade the pointed blade edge is caused to follow the contour of the centrally located pit or stone and then finally divide the fruit into two parts, at the time of which division the blade points again meet and the fruit is carried beyond the V-formation of the blades. The operation is such that a single slice only is taken while the fruit is carried by the longitudinal movement of the conveyor relative to the cutting edges of the blades. The fruit motion on the conveyor is sufficient not only to force the separate cutting edges apart but in forcing the edges apart the spring bias and pressure forcing the outer points in a direction to maintain the V-shaped relationship serves to exert the necessary force to provide the tearing and cutting action. When the fruit passes beyond the region of the cutting blades on the conveyor travel it is in a divided state, with the upper and lower halves capable of being moved to different regions.

The blades for cutting and tearing the fruit are mounted at a fixed height with respect to the conveyor component carrying the individual pieces of fruit so that by adjusting the position of the conveyor mechanism relative to the cutting edge in an up and down position, it being assumed that the blades cut horizontally, and by similarly adjusting the upper fruit gripping mechanism, the fruit can always be cut at approximately its mid-point. It will be appreciated in this connection that lacking an adjustment of the support of the fruit with respect to the cutting edges an oversize piece of fruit (that is, one above what will be termed an "average" size piece) would be cut below its center so that the upper portion would be larger than the lower portion or for an undersized piece of fruit the cutting operation would occur so that the lower divided portion might be larger than the upper portion. To avoid this possibility of unsatisfactory fruit division this invention provides for adjusting the cutting plane in a way to maintain the size of the cut fruit components substantially equal.

This adjustment of the cutting plane relative to the fruit is effected by a conveniently controlled servo mechanism, illustratively one of the hydraulic type, operating under the control of a sensing or size-determining gauge. In operation an adjustment in the position of the fruit gripping components is established with respect to the cutting instrumentality. Suitable coordination is established between the moving speeds of the fruit holding components of the conveyor mechanism and the upper fruit holding device, which components come into contact with the fruit in the region substantially adjacent to that at which the cutting operation is initiated. This coordination becomes important since the mechanism must hold the fruit in steady position immediately prior to and during the severing or cutting operation in which the two sections are cut. After cutting the separate supports serve to support the fruit prior to its discharge from the mechanism subsequent to the removal of the pit or stone.

With the foregoing in mind, there will be found to be included among the objects of the invention those of supplying fruit in a continuous flow to a cutting mechanism; cutting the supplied fruit into two parts of substantially like size with freedom from shredding or shavings adhering to one or the other cut sections; providing the cutting operation under the control of the fruit feed to simplify operational continuity; severing the fruit along the plane of suture and along a plane through the maximum diameter; cutting the fruit from the skin and through the flesh to the pit or stone and generally leaving the pit or stone in one half later to be removed; adjusting the plane of cutting to positions such that successive fruits are each divided into substantially equal parts without regard to the uniformity of size of successive pieces of fruit fed to the cutters; operating the cutter positioning components under the control of sensing devices measuring the relative sizes of successively fed fruit components; providing a high speed continuous and substantially trouble-free operation; increasing the operational efficiency of the cutting operation thereby for all size fruits to insure the highest grade output, and to reduce operational difficulties and maintenance.

Other objects and advantages will become apparent from the description and claims to follow, particularly so when considered in connection with the accompanying drawings in which, Fig. 1 is a schematic elevational view of the herein to be described machine;

Fig. 8 is a schematic and line diagram showing of the hydraulic control mechanism for adjusting the relative spacings of the fruit support components;

Fig. 9 is a section through the control valve for the hydraulic system; and

Fig. 10 is also a section through the control valve taken in a plane indicated as 10—10 on Fig. 9.

Figure 1:
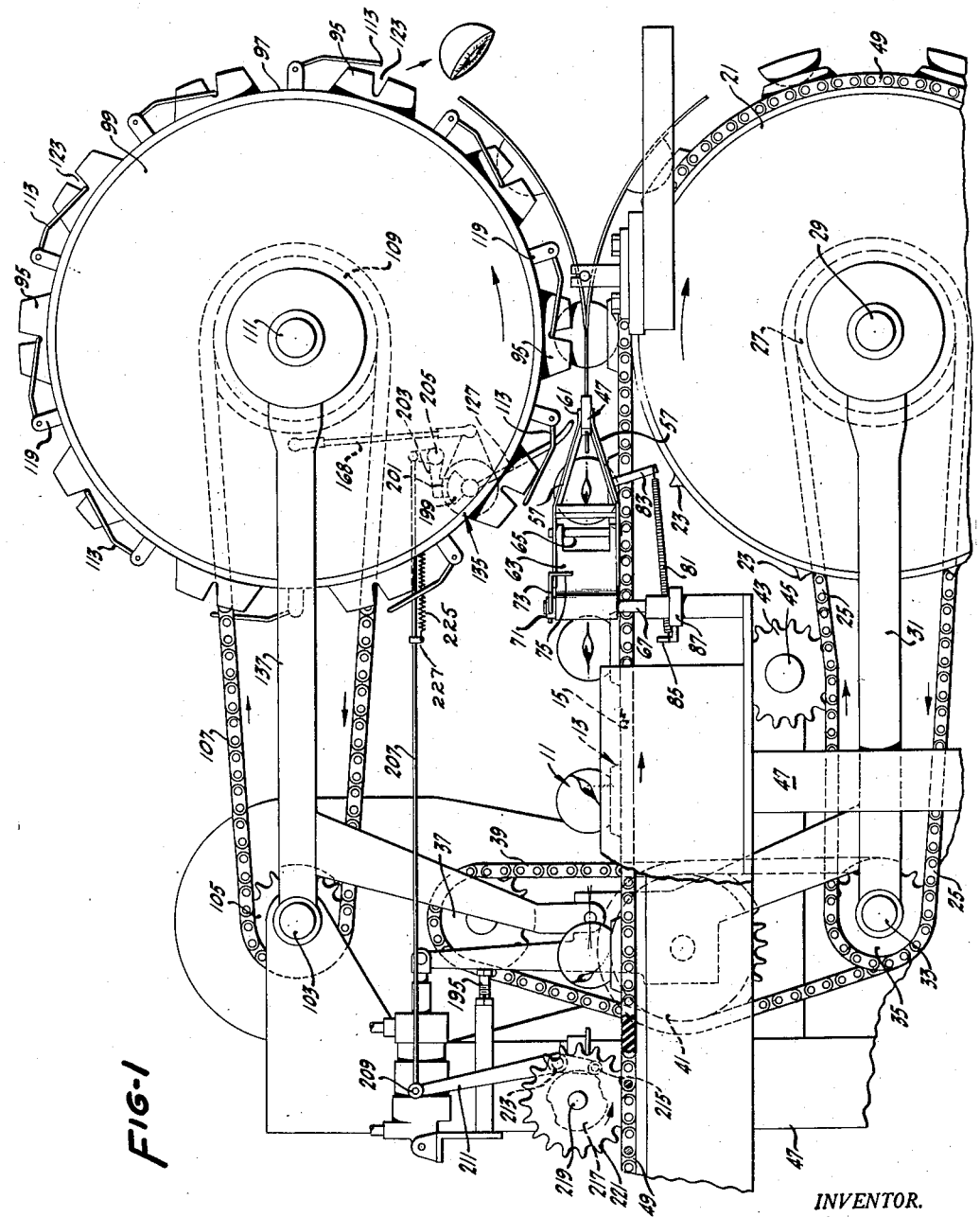

Referring now to the drawings for a further understanding of the invention, the fruit, for explanation purposes herein disclosed as being in the form of the drupes conventionally represented at 11, is supported by a fruit support cup 13, which is, in turn, secured to a conveyor mechanism or belt 15. This belt is arranged, illustratively, to travel in the direction shown by the arrows (see Figs. 1, 2, 5 and 6 in particular). Various ways for securing, or even removably locating and holding, the fruit support cups to the conveyor may be provided and, per se, form no specific part of the invention. However, illustrative of one form, the fruit support or locating cup may consist of a raised portion 17 of generally frusto-conical outer shape formed as a direct part of, or secured to, the conveyor mechanism, such as the belt, in any appropriate manner. Where the conveyor belt is formed of rubber, for instance, the support cup may be either molded directly to the conveyor belt or may be secured thereto by vulcanizing or any other selected means.

Figure 5:
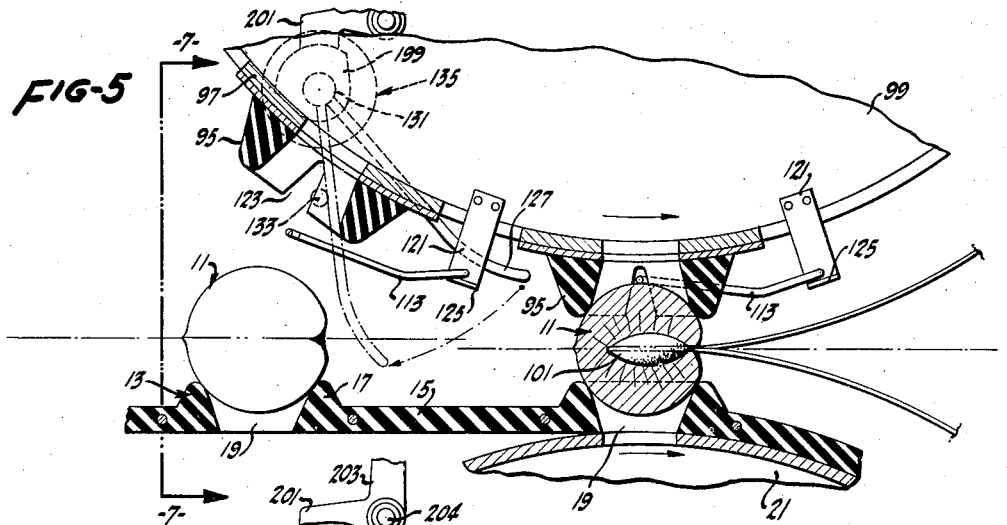
Fig. 5 is a view, partly in section, of a portion of the machine of Fig. 1 to show in particular the upper and lower fruit support components and the sensing device, with one fruit component being cut and a second fruit component approaching the upper fruit support.
Figure 6:
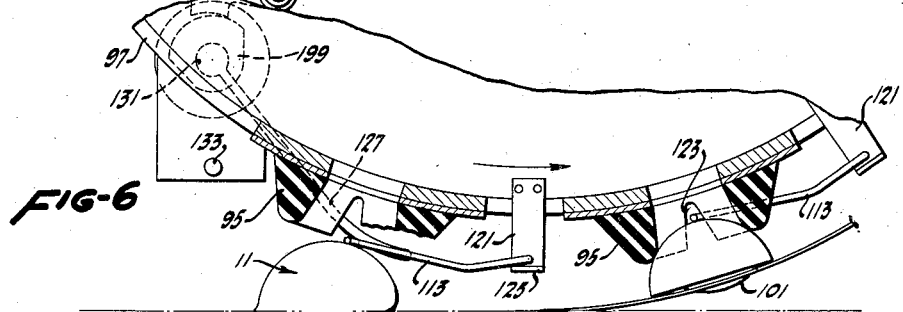
Fig. 6 is a view generally directed to a similar mechanism to Fig. 5 but with one fruit component already cut into two sections and a second fruit component being measured or gauged as to size by the sensing device.

The invention in its preferred form provides for orientation of the individual fruit components 11 in such a fashion that the largest diameter of the fruit (usually the plane of suture) is caused to extend in a plane generally parallel to the plane of the conveyor belt (illustratively see Figs. 5 and 6). The support cups each have an internal opening 19, preferably of the indicated cross-section, which extends completely through the conveyor belt mechanism. It need not be explained as a part of the present invention that in the operation of one preferred form of cutting machine for severing the fruit halves of the sort disclosed, provisions are made by mechanism not herein specifically shown for forcing a fluid outwardly through the opening 19. Such action causes the opening (particularly when formed as indicated) to function as a nozzle. The issuing fluid jet is of sufficient pressure and volume to raise the individual fruit pieces from the plane of the belt against the gravitational force acting upon the fruit. Then, during the ejection of the fluid, the suspended individual fruit pieces are oriented or turned within the fluid stream in the desired fashion, due to turning movement due to the fluid jet striking fruit.

After orientation, the fruit pieces are again caused to come to rest upon the upper rim of the support cups 13 in a generally centered position with respect to the cup and the axis of the internal opening 19 thereof. This is the position indicated generally in conventional manner by Figs. 5 and 6.

When operating, the mechanism herein to be explained, the conveyor belt 15 is wrapped at one end about a driving drum 21. The drum 21 has at regularly spaced intervals along opposite edges, and each on a circumferential path, suitable gripping components, such as teeth 23 (see Fig.1). Looking further at the showing of Fig. 1 the driving drum 21 is arranged to be driven to rotate in a clockwise direction by a driving belt or chain 25, which is wrapped around the conventionally represented sprocket 27 secured to the drum and held upon the drum support shaft 29 which is, in turn, held on arm supports 31 (of which only the one on the near side is shown for convenience of illustration). At its opposite end the drum support arm 31 is carried on the shaft 33 which forms a pivot point about which the arm can be swung through limited angles (either clockwise or counterclockwise) thereby to raise or lower the position of the upper surface of the drum 21 as it comes tangent to the conveyor belt 15, with any upward or downward movement of the drum 21 being dependent upon whether the arcuate motion of the arm 31 is counterclockwise or clockwise. A driving sprocket 35 is secured to shaft 33 for driving the drive belt or chain 25 when power is imparted to rotate the shaft 33 from any suitable driving mechanism (not shown).

This driving mechanism for rotating the shaft 33 is of a sort suitable (not shown) to rotate the drive sprocket 37 for moving a chain drive 39 rested about an idler sprocket 41 and driving a sprocket (not shown by Fig. 1), which is secured to the shaft 33 so that clockwise rotation of the driving sprocket 37 moves the chain drive 39 in a clockwise direction and causes clockwise rotation of the drum 21. Tension on the driving belt or chain 25 may be controlled by the tensioning sprocket 43 appropriately secured to the frame of the machine and movable or adjustable in either an upward or downward direction with respect thereto.

For the sake of clarity of illustration of other components, the precise method of securing the tensioning sprocket 43 to the frame of the machine is not shown. However, it will be appreciated that the shaft 45, upon which the sprocket is supported, is carried by the machine frame work conventionally represented at 47, which consists of both uprights and cross members. The shaft may be journalled in a suitable bearing, not shown, which is secured on the frame members 47 in a fashion to be adjustable in both an upward and a downward direction.

Driving chain 39, in turn, imparts a driving force upon the belt or chain 25 and with it rotation of the drum 21 and the conveyor 15. As the conveyor moves in the directions shown by the arrow, it is evident that the thereto attached fruit support cups 13 likewise are moved in the direction of suitable cutting members, collectively represented on Fig. 1 at 47, which cutting members are effective to operate in the fashion generally indicated by the depicted components of Fig. 2 and the several parts of Fig. 3.

Figure 2:
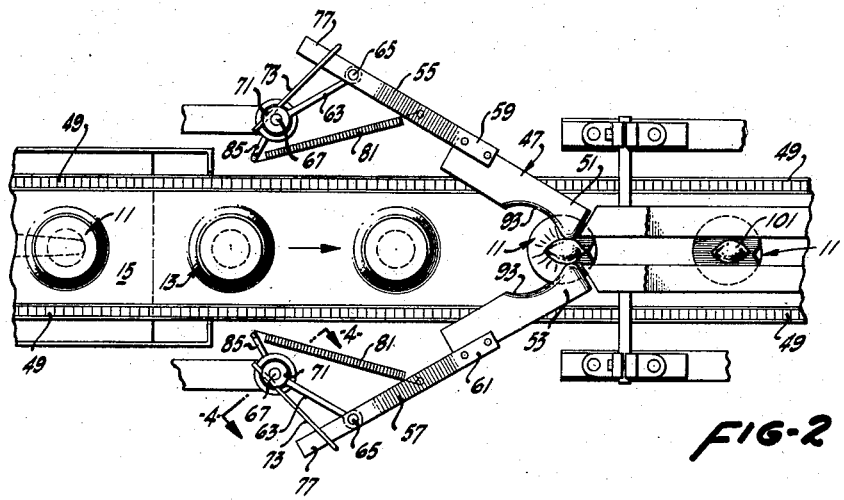
Fig. 2 is a plan view of a part of the machine of Fig. 1 to show the relationship of the cutting devices relative to the conveyor mechanism and with the upper fruit locating means removed.
Figure 7:
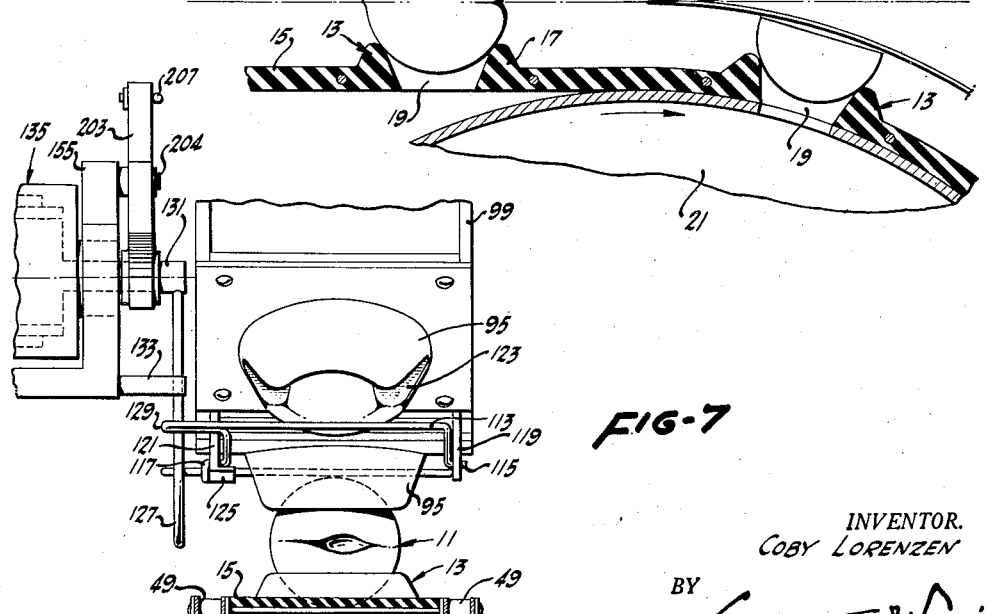
Fig. 7 is a view of the mechanism of Fig. 5 along a plane indicated at 7—7 on Fig. 5 and looking in the direction of the arrows.

The conveyor belt mechanism 15 has a chain mechanism secured at either side thereof, as indicated particularly by Figs. 1 and 2. This chain mechanism has its various links 49 so located that when the belt is wrapped about the drum 21 the gripping teeth 23 are adapted to fit into the links in well known manner for driving purposes. As indicated particularly by Fig. 2, the chain links 49 are located at either side of the belt. Likewise, the teeth on the drum 21 are laterally separated from each other by distances corresponding to the indicated width of the conveyor belt 15, and the thereto attached chain links 49 (see Fig. 7).

When driving power is imparted to the drum 21, the fruit components 11, which are rested upon the rims of the fruit support cups 13, move along with the belt toward the cutting mechanism 47, which consists of a pair of cutting knives 51 and 53, each of which is of generally similar shape. The knives 51 and 53 are supported from arms 55 and 57, which, as indicated, particularly by Fig. 1, are of bifurcated form at their end remote from the knives with the separate parts meeting substantially at the gripping plates 59 and 61. There are upper and lower gripping plates and by means of suitable rivets or nuts and bolts extending therethrough a knife blade is secured to the outer edge of the arm. The other pair of arms is secured to a blade member 63 of similar character, with one knife located at one side of the conveyor belt and the other knife located to the other side of the conveyor. A suitable anchoring pin 65 extending through one end of the bifurcated arms, as well as the curved end portion of the plate member 63, forms a guiding and supporting component. The securement of the bifurcated arms and the plate member is of a sort to prevent separation of the two components but to permit arcuate or turning motion of the bifurcated arms 55 and 57 and the thereto attached knife blades 51 and 53 about the anchoring pin 65 as an axis and pivot.

Figure 4:
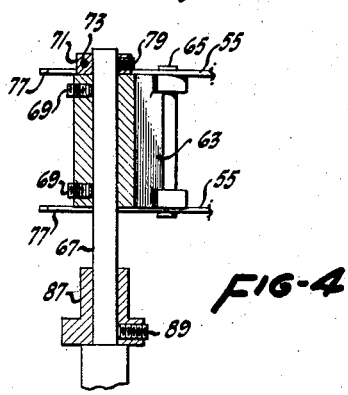
Fig. 4 is a view, partly in section, taken on the line 4—4 of Fig. 2 and looking in the direction of the arrows to show the cutter support.

The plate member 63 is secured to a support spindle 67, which is attached to the machine frame 47 and protrudes outwardly and upwardly thereof (see particularly Figs. 1, 2 and 4). Angular positioning of the plate member 63, as it fits about the support spindle 67 extending outwardly from the frame, is established by securely fastening the plate to the spindle in any desired angular location, illustratively, by the set screws 69 thereby to prevent angular rotation of the plate 63. A collar 71 is secured to the upper end of the support spindle. The contactor pin 73, with a downwardly depending end or lip member 75 extends outwardly to straddle the end 77 of the bifurcated member 57 extending beyond its securement to the anchoring pin 65. The bifurcated arms 57 and the thereto attached cutting knives are free to rotate about the anchoring pin 65 as a support and axis of rotation. The downwardly depending end or lip 75 of the contactor 73 serves to limit the extent to which the knife blade 51 can rotate about its pin 65 in a clockwise direction. A similar pin limits the counter-clockwise rotation permitted for the knife blade 53 about its anchoring pin 65.

The angle at which the collar is set, and thus the rotation of the arm, is established and determined by the set screw 79. It thus may be varied at will.

It is desirable at all times to provide, as indicated, for instance, by Fig. 3 in particular, as well as by Fig. 2, an arrangement whereby the pointed edges of the knife blades 51 and 53 may be maintained in contact prior to and following the actual fruit cutting operation. The construction herein set forth permits separation of the knives only to the extent that the blade point follows the contour of the pit or stone of the fruit. Tension to maintain such blade positioning is applied to each of the blades by a tensioning spring 81, which has one end secured to a pin 83 downwardly depending from each of the arms 55 and 57, and which has its other end connected to a pin 85 secured to a collar 87. The collar 87 is carried upon the support spindle 67 and is locked in any desired angular position thereon by a convenient fastening mechanism, such as the set screw 89.

The cutting blades 51 and 53 have their outer points 91 rounded, as shown particularly by the blades diagrammatically represented in the various parts of Fig. 3. In the position when the cutting blades are free from any force tending to separate them against the tension of the springs 81, these rounded edges 91 are in contact. Inwardly from the outer point 91 each blade is recessed arcuately concave, as indicated at 93 for each of the blades 51 and 53. Each blade has its outer end 91 and the arcuate surface 93 sharpened to provide a keen cutting edge. This feature is indicated particularly on the drawings by the shaded portions shown to exist on the arcuate sections 93 of each cutting knife.

With the fruit 11 supported on the fruit support cups 13, and moving with the conveyor mechanism, as indicated by the arrow, first contact with the cutting knives occurs at the concavely curved inner portion 93 of the arcuately shaped blades. This is diagrammatically shown in its first position by Fig. 3(a). Considering this figure, the arcuate shaped blades 51 first slice through the outer skin of the fruit at its leading edge from opposite sides. The fruit is held from beneath by the fruit support cup 13 and also from above by complementarily shaped fruit locating cups 95 carried and supported about the outer periphery 97 of an upper drum 99 (later to be considered in further detail).

At the time of cutting a positional relationship is established between the cups 13 and 95 which by holding both from above and below relative to the cutting knives 51 and 53 makes it possible for the knives to cut and divide the fruit into two parts (each substantially of equal size) as it moves through and between these knives. Thus, movement of the fruit from the position of first contact with the arcuate shaped blade portion 93 to a position such that the fruit pit or stone 101 is advanced to meet the outer points 91 of the cutting blades 51 and 53 is such that any further movement of the fruit, and with it its embedded pit or stone, causes the cutting knives, and the bifurcated arms 55 and 57 to which they are secured, to turn about the anchoring pins 65 as pivots and against the force exerted by the springs 81 to maintain the knife points in contact with the pit. Under these circumstances the point 91 on each knife follows the contour of the fruit pit or stone 101, as indicated particularly by Fig. 3(b). Continued movement of the fruit with the conveyor causes the fleshy fruit part to be sliced to divide the drupe into two parts—the upper and the lower.

Figure 3A:
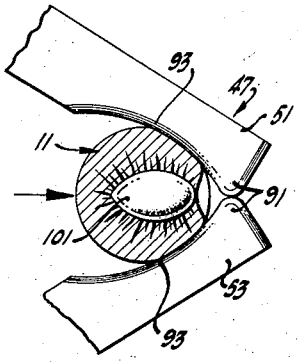
Fig. 3 shows by its parts (a), (b), and (c) the relative position of the fruit cutting blades at the start of the cutting operation, approximately midway through the cutting operation, and at substantially the completion of the cutting operation respectively.
Figure 3B:
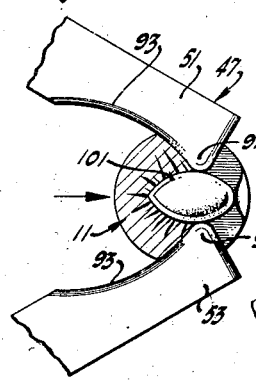
Figure 3C:
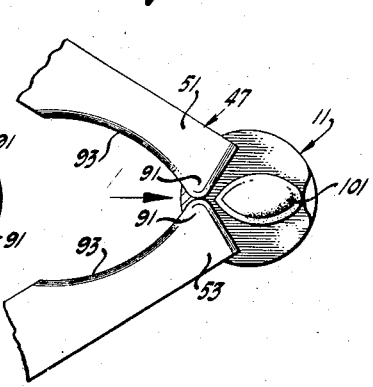

As the fruit is travelled with respect to the normal positions of the points 91 of the cutting knives 51 and 53 until the fruit pit or stone 101 has moved beyond the knife point, as shown particularly by Fig. 3(c), the knife points return to a meeting position under the force exerted thereon by the springs 81. The remaining or rear part of the fruit is then sliced by the combined action of the arcuate shaped portion 93 of the knives 51 and 53, as well as the cutting points. Accordingly, as can be observed from a consideration of the showing of Fig. 3 in relation to what is shown by Figs. 1. and 2, each piece of fruit as it comes within the region of the cutting knives is divided into an upper and lower section by virtue of the conveyor motion (while the fruit is held from above and below) and the pressure exerted to maintain the blade points in contact by the springs 81. The showing of Figs. 5 and 6, particularly in conjunction with the schematic arrangement of Fig. 1, depicts the manner of holding the individual fruit pieces in a desired position with respect to the cutting knives.

Considering now the arrangement of Figs. 5 and 6, as the conveyor mechanism 15 progressively moves in the direction shown by the arrow adjacent to it that the fruit 11 is carried toward and beyond the plane of the cutting knives. As hereinabove suggested, it is important, if the fruit is to be divided into two substantially equal parts without a multiplicity of cutting operations by merely a single slicing from the leading edge to the rear edge, that the components be securely held. To this end the upper drum 99, which carries the fruit locating cups 95 on its outer periphery, is driven from the suitable prime mover (not shown) turning the driving shaft 103 and with it a suitable drive sprocket 105 in a way to drive a driving chain 107 which is looped about a driven sprocket 109 secured to the drum shaft 111. The driven speed of the upper drum 99 should be such that the velocity of the cups 95 at the contact area corresponds to that of the fruit support cups on the conveyor. Since direct contact is established the simplest construction is to provide drum peripheries of like circumference for drums 21 and 99, which permits the upper and lower fruit supporting cups to move at the same speed in the region of the cutting knife.

As the upper drum 99 is rotated by the indicated drive mechanism, and which for clockwise rotation of the lower drum 21 will be in a counter-clockwise direction, the upper fruit supporting cups 95 contact the fruit pieces 11 just prior to its movement by the conveyor to a location such as that indicated by Fig. 3(a). That component of lateral motion of the upper drum which is parallel to the direction of conveyor belt motion is not precisely the same as that of the conveyor belt at the instant of establishing initial contact between the upper cup and the belt, although it is important that these two speeds be equal at the time the tangent to each drum at the point where cutting occurs shall become parallel to the conveyor belt. Inequalities in relative speeds of the conveyor belt and the upper drum in a direction corresponding to that along which the conveyor belt moves are compensated by the flexibility of the conveyor belt and the fact that the upper fruit cups are also generally resilient in their nature. Consequently, with the fruit support cups of the upper drum 99 meeting the upper surface of the fruit and holding the fruit in fixed location with respect to its ability to turn relative to the fruit support cups on the conveyor belt a relative relationship between the two components is established whereby slicing or cutting of the fruits into two parts may readily be accomplished.

Were it possible to provide fruit components for cutting which were all of like diameter it would be unnecessary to adjust, with each cutting operation, the spacing between the outer edges of the upper and lower fruit supporting cups. However, unless the fruit can be held in a way by which its lower support (and thus its upper support) is adjusted for size variance, the cutting will not occur at substantially the precise middle or center of the fruit, as already explained. The invention therefore provides a compensating means for controlling the separation between the peripheries of each of the upper and lower drums, which sensing or compensating mechanism operates at the instant when the fruit is brought within a region where the cups supporting it are separated only by a distance slightly greater than the fruit diameter.

The sensing mechanism, as herein provided, is essentially in the form of a bail 113, which is loosely supported at its opposite ends 115 and 117 (see Fig. 7) in brackets 119 and 121, which are secured to opposite ends of the upper drum 99 at points about the drum end substantially intermediate or at least between the adjacent fruit locating cups 95 on the drum periphery. Each of the upper fruit locating cups 95 has an internal recess 123 extending across it in a direction parallelling the drum axis. The recess provides a space into which the central portion of the bail 113 may fit at the time the fruit support locating cups 95 reach a position to hold the fruit relative to the fruit support cups 13 on the conveyor mechanism. Also, as can be seen particularly from Fig. 1, the recess provides a location within which to fit the central portion of the bail 113 as the drum is turned and prior to the time when the bail moves outwardly by gravitational forces to rest upon the fruit as the fruit moves along the conveyor.

The bracket 121 has an inwardly extending lip 125 which limits the amount of angular rotation of the bail 113 in a counter-clockwise direction of rotation due to gravitational forces. With the movement of the fruit along the conveyor toward the cutting point the rotation of the upper drum bringing the upper fruit locating cup 95 closer to the fruit 11 as it moves on the conveyor, the central portion of the bail 113 will finally rest against the upper surface of the fruit 11, as shown particularly by Fig. 6 where the bail 113 is indicated as resting against the fruit and at a point where it is just clear of the inward lip on the bracket 121. At this time, the feeler finger, or valve lever, 127 is contacted by an outer extension 129 of the bail 113 and depending upon the position of the bail at the instant of contact will determine whether the feeler finger is rotated (as the arrangement is shown) in a counter-clockwise direction about its support shaft or axis 131, or whether the finger will rest against the stop 133 which limits its tendency to rotate in a clockwise direction under the force of gravity as the drum turns. The feeler finger 127 is spring biased normally to come to rest against the stop 133 prior to each alining operation and it serves to control the opening or closing of a valve mechanism shown particularly by Figs. 9 and 10 and designated generally at 135. The change in its position between the two extremes (see particularly Figs. 5 and 8) is termed the information region and the positioning, as will later appear, will regulate the opening and closing of the control valve 135, later to be described.

Since the size of the individual fruit components 11 varies within selected limits it is essential, if the fruit is not to be crushed when held between the drums 21 and 99, that the drums separate slightly at the cutting point which is the point where the drums come closest together, or, in order securely to hold and locate smaller size fruit pieces, that they be brought closer together at this point, depending upon whether or not the fruit is large or small with respect to a selected average size. It has already been explained that the lower drum 21 can be moved with movement of the support arm 31 about the shaft 33 in an arcuate manner. The upper drum 99, which is adapted to turn about the drum shaft 111 has this shaft supported at the end of a support arm 137 which extends outwardly from the driving shaft 103.

While it is not shown in detail by Fig. 1 as already stated, it will be understood that for the purpose of drum support each of the lower drum 21 and the upper drum 99 is supported from a pair of support arms 31 or 137, as the case may be, one arm being at each end of the drum and each of the two arms being supported about the same shaft 33 or 103, as the case may be.

When the sensing feeler finger or valve lever 127 is turned or angularly rotated within the information region as a result of its movement away from the stop 133, this turning produces a rotation of an internal hollow valve cylinder 139 which is the inner one of a pair of valve cylinders of which the outer member is indicated by the cylinder 141. These two valve cylinders have longitudinal slots 143 and 145, respectively, about their periphery, as indicated by Figs. 9 and 10. The inner valve cylinder 139 may have a series of four (or more or less as desired) longitudinal openings 143 generally uniformly spaced about its cylindrical wall. Similarly, the outer valve cylinder has an equal number of slots 145 about its periphery, which slots in one selected angular position correspond to and line with the slots of the inner cylinder. Rotation of the inner valve cylinder 139 with respect to the outer valve cylinder 141, closes to some extent or completely as the case may be, and depending upon the degree of rotation, the passageway provided by the slots from the outer cylinder through the inner cylinder and into the central region or chamber 147 of the valve.

The valve 135 as it is formed is usually of the rotary cylinder valve type and comprises an outer casing 149 of generally cylindrical form. An entering conduit or supply line 150 supplies fluid through an internal opening 150' near the center of the outer wall of the cylinder 149. This supplied fluid then flows into an annular passage 151 internally of the cylindrical wall 149 of the valve and externally of the central portion of the valve cylinder 141 and into which the openings 143 communicate to carry fluid into the interior of valve cylinder 139. A pair of outlet openings 152 and 152' connect to the ends of the outer cylinder 149 and provide openings through which the circulating fluid leaves the valve, as will later be explained.

Purely illustratively, the outer valve cylinder 149 has end caps 153 and 153' spaced from the ends of its inner and outer cylinders 139 and 141 to provide a pair of end chambers 154 and 154' into which fluid permitted to enter the central region of the inner valve cylinder 139 can escape through end openings 155 in the end wall thereof. The outlet flow from the chambers 154 and 154' is then through the openings 152 and 152' respectively.

The inner valve cylinder 139 is supported upon two central shaft members 156 and 156' of which the shaft 156, which joins to the shaft 131 on which the feeler finger or valve lever 127 is keyed, protrudes through the end caps 153 and is journalled in a suitable bearing 157. The other shaft end 156' terminates in a suitable bearing 158' contained within the end cap member 153'. The inner valve cylinder 139 is thus fitted within the outer cylinder 141 in rotatable fashion determined by rotation of shaft 156 to open and close the ports 143 and 145 relative to each other. The annular cavity 151 into which fluid enters from the inlet opening 150' is provided by making the outer cylinder 141 generally spool shaped (as shown particularly by Fig. 9) and fitting it tightly within the internal wall of the cylinder 149. It will be noted that the internal opening 150' is about midway along the length of the cylinder 149 while the outlet openings 152 and 152' are beyond the ends of the cylinders 139 and 141 supported within the outer cylindrical member 149.

Any rotation of the inner cylinder 139 relative to the outer cylindrical member 149, into which the cylindrical member 141 is tightly pressed, from a position where the longitudinal slots 143 and 145 are alined and centered with respect to each other to permit a maximum flow of fluid within the internal portion of the cylindrical member 139, will restrict and reduce the fluid flow through the valve. Consequently greater pressure is developed at the inlet with reduced flow and, as will be seen from what is to follow, greater pressure builds up in the hydraulic system used to control the position of the drum members.

With this consideration of the general nature of the valve mechanism as shown particularly by Figs. 9 and 10, reference may now be made to the schematic diagram of the drum position control mechanism shown by Fig. 8. In Fig. 8 a suitable pump 167 such as the indicated rotary pumps (also carrying the designation "P" and an arrow) withdraws fluid (preferably a liquid) contained within the reservoir 169 and forces this fluid through the pipe or conduit 171 which connects to the inlet 150 of the valve mechanism 135. The fluid passing beyond the valve 135 and through its outlet connection 165 (established at the outlet points 152 and 152') then flows through the conduit or pipe 173 back into the reservoir 169. There is a bleeder pipe or conduit 175 leading from the pipe or conduit 171 into the drum actuating cylinder 177 at one end thereof. Within the cylinder 177 there is a piston 179 attached to a piston rod 181 which is linked at 183 to a link mechanism 185. The link 185 connects at one end 187 in bifurcated fashion (not shown) to each of the arm supports 31, to which the drum shaft 29 and the drum 21 is attached.

Similarly, the support arms 137 adapted for movement about the driving shaft 103 as an axis for controlling the up-and-down position of the upper drum 99 connects to the link mechanism 185 by way of the connector or upper link 189, which is secured in any appropriate manner, such as schematically indicated at 191 to the link 185. These two components are connected by the connection pin 191 which is movable within a slot 193.

From a consideration of the showing of Fig. 8 it will be appreciated that any movement of the piston 179 to the right from the position shown, will force the piston rod also to the right and so doing, likewise bring about, because of the link connection, a change in the position of the support arms 31 and 137 for the drums 21 and 99 respectively so as to move the support arms 31 and 137 between the positions shown to those schematically illustrated by the dot-dash lines 31' and 137'. This shift in position of the arms 31 and 137 will, of course, change the position of the drum support shafts 29 and 111 to new positions 29' and 111', and thus separate the drums at the region of cutting, as indicated by the drawing.

The position of the piston 179 within the cylinder 177 changes in accordance with the change in pressure within the pipe or conduit 171. For conditions when the ports or longitudinal openings 143 and 145 in the valve cylinders 139 and 141 are completely open (that is maximum fluid transfer occurs) the pressure in the line 173 will be equal to that in the line 171 and the piston 179 will remain at the position to the extreme left as shown, and the link 185 will rest against the stop 195. However, for a condition where the tested fruit size is larger, thus causing the inner valve cylinder 139 to be rotated so that its openings 143 uncover less of the openings 145 in the outer cylinder 141, pressure will be built up in the pipe or conduit 171 which is greater than that in the pipe or conduit 173 with the result that this pressure will be transferred through the bleeder pipe 175 into the interior 197 of the cylinder 177 and force the piston 179 to the right to provide the motion already explained.

When the internal cylinder 139 is rotated relative to the outer cylindrical member 141, and thus the outer cylinder 149, to restrict the fluid flow through the valve and thereby cause the drum members to spread further and further apart, this motion will continue as long as pressure is exerted on the actuating cylinder until the limit of motion is reached. With the piston 179 being moved with increased pressure within the line 175 to the right the mechanism is such as to provide for spreading the drums 21 and 99 with pressure increases in the line 171. Whenever the internal valve cylinder 139 is returned to its original position with respect to the valve cylinder 141, the slots 143 and 145 are generally alined and provide a maximum flow of fluid through the valve which, in turn, permits suitable spring loading on the cylinders to overcome the force on the hydraulic actuating piston, thus to bring the drums again closer together. At times when the inner valve cylinder 139 is rotated by a force acting thereon and occasioned by movement of the feeler finger or valve lever 127 rotating about the shaft or axis 131 to which it is keyed, and which shaft forms an extension of the shaft 156, operating on the valve so as to restrict the flow of fluid through the valve to spread the drums apart the drum motion will continue and the spread becomes greater and greater as long as pressure is exerted along the hydraulic actuating cylinder. The linkage shown particularly by Fig. 8 at 168 from the valve body which connects the valve arm to the drum arm constitutes a feedback linkage since by virtue of connection through the plate member 170 as the drums tend to separate the linkage will rotate the outer cylinder 149 to which the plate 170 is attached (and thus also rotate the cylindrical valve member 141 which fits tightly within the outer cylinder 149) with respect to the inner valve cylinder 139 toward the original position to establish an hydraulic balance in the system and restrict the movement of the drums to an amount proportional to the rotation of the inner cylinder 139, that is, proportional to the actual change in fruit size.

To maintain a return and equilibrium position it is desirable that following each valve positioning the valve should be reset in the time between the passage of successive pieces of fruit beneath the feeler bails 113. A brake mechanism (see Fig. 1) is provided whereby the displacement of the inner cylinder is held between successive cuttings. A change in the relative position of the valve cylinders 139 and 141 is provided by way of the rotation of the feeler finger or valve lever 127 causing a generally sector-shaped plate 199 carried upon the shaft 156 to turn, with each turning motion indicating the displacement of the feeler finger or valve lever 127 from the stop 133. The sector-shaped plate is clamped in the selected position by a brake shoe 201 which comes to rest thereon.

The brake shoe is attached to a bell crank 203 which is pivoted about the shaft or axis 205. The outer end of the bell crank 203 is connected to a connecting rod 207 which is attached at its opposite end 209 to a second bell crank 211, which is pivoted about a shaft 213 and whose opposite end 215 is made in the form of a cam follower adapted to ride on the periphery of the cam 217. The cam 217 is attached to a shaft 219 journalled to the frame (not shown at this part) and which carries a driven pinion 221, the teeth of which are meshed with the links at one side of the conveyor mechanism. The cam surface 217 (as indicated by Fig. 1, for instance) has a central portion on either side of minimum diameter, and its opposite ends are formed of larger diameter so that the cam follower 215, when it rides about the cam surface with rotation of the driven pinion 221, will move in-and-out and consequently by the motion transferred to the brake shoe 201 will hold the sector-shaped plate 199 in a desired position.

In the operation of the braking arrangement the cam lever, brake, and sector arrangement are such that the brake shoe 201 is in contact with the sector shaped plate 199 at all times except that during which the sensing finger is picking up information from the bail 113 resting on the fruit just about to enter the knives and within the region marked (as in Fig. 8 for instance) by the legend "Information Region." During this particular period the cam 217, cam follower 215 and the indicated linkage provided by the connecting rod 207 and the bell cranks 211 and 203 serve to lift the brake shoe and permit the spring loaded sensing lever of the control valve to return quickly against the stop 133 representing the zero position of the drums and then immediately be raised while retracted by the bail an amount corresponding to the particular fruit size. Just before the bail again rides off the end of the sensing lever the brake shoe contacts the sector plate 199 and holds the valve position until the next bail reaches the mentioned information region. In order to insure quick release of the brake shoe 201 from the sector plate 199 during the sensing operation when the cam follower 215 is on the recessed part of cam 217 there is secured to the connecting rod 207 a suitable spring biasing member 225. This spring biasing member 225 has one end secured to the connecting rod 207 by any suitable form of connector, such as the indicated collar and set screw 227. The opposite spring end is secured in any desired manner (not shown) to a part of the framework. Accordingly, the force exerted by the spring 225 is such always in a direction to tend to move the connecting rod 207 to hold the brake in an off position which for the greater part of the time is prevented by the shape of the cam 217.

Having now described the invention what is claimed is:

1. Fruit handling apparatus comprising a plurality of fruit locating cups each adapted to be moved relative to a fruit cutting point and each to have one fruit piece located thereby, cutting means adapted for slicing each fruit piece as moved by the fruit locating cups thereby to cut each fruit piece into half at a cutting point, means adjacent to the motional path of the fruit locating cups and also adjacent to and ahead of the slicing point for sensing the size of the fruit component to be cut, a second plurality of fruit locating cups of a form similar to the first plurality of fruit locating cups, means to move the second set of fruit locating cups an inverted relationship relative to the first locating cups and fruit adapted to be located thereby to contact the fruit immediately prior to and during the operation of the slicing means thereby to provide means to hold the individual fruit pieces at two points securely and against rotation, servo apparatus responsive to pressure changes in a portion thereof for adjusting the spacing of the cups of the first and second plurality proportional to the size of instantaneously located fruit pieces within the slicing region so that for larger and smaller size fruit pieces the cups are spaced a greater and lesser distance respectively from each other and each cup is uniformly spaced with respect to the slicing means so that fruit pieces are substantially centered relative thereto, and adjustable means for controlling the operation of the servo apparatus with the adjustment of the sensing means controlled by the individual fruit pieces.

2. Fruit handling apparatus comprising a plurality of fruit locating cups each adapted to have one fruit piece located thereby, means for moving the cups relative to a cutting point, cutting means adapted for slicing each fruit piece as moved by the fruit locating cups thereby to cut each fruit piece into half at the cutting point, means adjacent to the motional path of the fruit locating cups and also adjacent to and ahead of the slicing point for sensing the size of the fruit component to be cut, a second plurality of fruit locating cups of a form similar to the first plurality of fruit locating cups, means to move the second set of fruit locating cups in inverted position relative to the first locating cups and fruit adapted to be located thereby to contact the fruit immediately prior to and during the operation of the slicing means thereby to provide means to hold the individual fruit pieces at two points securely and against rotation, servo apparatus responsive to pressure changes in a portion thereof for adjusting the spacing of the cups of the first and second plurality proportional to the size of instantaneously located fruit pieces within the slicing region so that for larger and smaller size fruit pieces the cups are spaced a greater and lesser distance respectively from each other and each cup is uniformly spaced with respect to the slicing means so that fruit pieces are substantially centered relative thereto, valve means for controlling the operation of the servo apparatus, and means for opening and closing the valve in accordance with the adjustment of the sensing means controlled by the individual fruit pieces.

3. Fruit handling apparatus comprising a plurality of fruit locating cups each adapted to have one fruit piece located thereby, means for moving the cups relative to a cutting point, cutting means adapted for slicing each fruit piece as moved by the fruit locating cups thereby to cut each fruit piece into half at the cutting point, means adjacent to the motional path of the fruit locating cups and also adjacent to and ahead of the slicing point for sensing the size of the fruit component to be cut, a second plurality of fruit locating cups of a form similar to the first plurality of fruit locating cups, means to move the second set of fruit locating cups in inverted position relative to the first locating cups and fruit adapted to be located thereby to contact the fruit immediately prior to and during the operation of the slicing means thereby to provide means to hold the individual fruit pieces at two points securely and against rotation, hydraulic-servo apparatus responsive to pressure changes in a portion thereof for adjusting the spacing of the cups of the first and second plurality proportional to the size of instantaneously located fruit pieces within the slicing region so that for larger and smaller size fruit pieces the cups are spaced a greater and lesser distance respectively from each other and each cup is uniformly spaced with respect to the slicing means so that fruit pieces are substantially centered relative thereto, and valve means for establishing different pressures in hydraulic-servo system proportional to valve opening and closing, means for determining valve opening in accordance with the adjustment of the sensing means controlled by the individual fruit pieces, and means controlled by the servo means for varying the separation of the cups of the two pluralities at the cutting region to compensate for different fruit sizes.

4. The apparatus claimed in claim 3 comprising, in addition, a hydraulic servo cylinder adapted to respond to changes in pressure in the hydraulic servo path for controlling the cup separation at the cutting point.

5. The apparatus claimed in claim 4 comprising, in addition, cam means operating concurrently with the movement of the fruit locating cups for releasing the valve mechanism for a return to a zero position prior to each testing operation.

6. Fruit handling apparatus comprising a first plurality of fruit locating cups each adapted to locate one fruit piece, fruit cutting means for dividing each fruit piece into two sections in one of which the pit is retained, means to move the fruit locating cups of the said first plurality in sequence to positions adjacent to the cutting means, size sensing means adjacent to the motional path of the fruit locating cups and also adjacent to and ahead of the cutting point for sensing the size of the fruit components to be cut, a second plurality of fruit locating cups of a form similar to the first plurality of fruit locating cups, means to move the second plurality of fruit locating cups relative to the first plurality of locating cups and any thereby located fruit to bring the cups of the second plurality into contact individually with a fruit piece located by the first plurality immediately prior to and during the operation of the cutting means thereby to provide means to hold the individual fruit pieces from spaced points securely and against rotation, servo apparatus for adjusting the spacing of the cups of the first and second plurality relative to each other in the region of fruit contact and cutting so that for larger and smaller size fruit pieces respectively the cups are spaced at greater and lesser distances respectively from each other and each cup is spaced a substantially equal distance from the cutting means, servo control means, and means for adjusting the servo control means subsequent to movement of each cup of each plurality past the cutting means and prior to the next cutting operation thereby to determine the separation of the cups of the separate pluralities by the position of the sensing means.

7. Fruit handling apparatus comprising a conveyor, a first plurality of fruit locating cups each adapted to locate one fruit piece carried by the conveyor, fruit cutting means for dividing each fruit piece into two sections in one of which the pit is retained, means to move the conveyor and the thereby-located fruit locating cups of the said first plurality in sequence to a position adjacent to the cutting means, a drum positioned adjacent to the conveyor, a second plurality of fruit locating cups of a similar form and positionally inverted relative to the first plurality of fruit locating cups carried upon the drum periphery, means to rotate the drum to move the second plurality of fruit locating cups relative to the first plurality of locating cups and any thereby located fruit to bring the cups on the drum periphery into contact individually with a fruit piece located by the first plurality of cups in a region where the drum and conveyor approach a tangent position and immediately prior to and during the operation of the cutting means thereby to provide means to hold the individual fruit pieces from spaced points securely and against rotation, size sensing means carried by each drum-supported cup to sense fruit size adjacent to the motional path of the conveyor-supported fruit locating cups and also adjacent to and ahead of the cutting point for sensing the size of the fruit component to be cut, hydraulic-servo apparatus for adjusting the spacing of the drum and conveyor and thereby the cups of the first and second plurality relative to each other in the region of fruit contact and cutting so that for larger and smaller size fruit pieces respectively the cups are spaced at greater and lesser distances respectively from each other and each cup is spaced a substantially equal distance from the cutting means, servo control means, and valve control means for adjusting the servo control means under control of the sensing means subsequent to movement of each cup of each plurality past the cutting means and prior to the next cutting operation thereby to determine the separation of the cups of the separate pluralities by the position of the sensing means.

8. The apparatus claimed in claim 7 comprising, in addition, a hydraulic servo cylinder adapted to respond to changes in pressure in the hydraulic servo path for controlling the drum and conveyor separation at the cutting point.

9. The apparatus claimed in claim 8 comprising, in addition, cam means operating concurrently with the movement of the fruit locating cups for releasing the valve mechanism for a return to a zero position prior to each testing operation.

10. Fruit handling apparatus comprising a first plurality of serially positioned fruit locating cups each adapted to have one fruit piece located thereby, means to move the said plurality as a unit so that the individual cups successively pass a work point, cutting means located at the work point and adapted for cutting each fruit piece as moved by the fruit locating cups into half sections, sensing means located adjacent to the motional path of the fruit locating cups and also adjacent to and ahead of the point of cutting for sensing the size of the fruit component to be cut, a second plurality of fruit locating cups of a form similar to the first plurality of fruit locating cups, means to move the second set of fruit locating cups relative to the first locating cups and fruit adapted to be located thereby to contact the fruit subsequent to size sensing and immediately prior to and during the operation of the cutting means thereby to provide means to hold the individual fruit pieces at a pair of spaced points securely and against rotation, servo apparatus responsive to pressure changes in a portion thereof for varying the spacing of the cups of the first and second plurality from fruit piece to fruit piece as the fruit pieces pass within the cutting region so that for larger and smaller size fruit pieces the cups are spaced greater and lesser distances respectively from each other and each cup is uniformly spaced with respect to the cutting means so that fruit pieces are substantially centered relative thereto, adjustable means for controlling the operation of the servo apparatus with the adjustment of the sensing means controlled by the individual fruit pieces, valve mechanism included in the servo path, and means to control the degree of valve opening and closing following each change in the position of the sensing means thereby to establish a control of the pressure in a part of the servo apparatus.

11. Fruit handling apparatus comprising a first plurality of serially positioned fruit locating cups each adapted to have one fruit piece located thereby, means to move the said plurality as a unit so that the individual cups successively pass a work point, cutting means located at the work point and adapted for cutting each fruit piece as moved by the fruit locating cups into half sections, sensing means located adjacent to the motional path of the fruit locating cups and also adjacent to and ahead of the point of cutting for sensing the size of the fruit component to be cut, a second plurality of fruit locating cups of a form similar to the first plurality of fruit locating cups, means to move the second set of fruit locating cups relative to the first locating cups and fruit adapted to be located thereby to contact the fruit immediately prior to and during the operation of the cutting means thereby to provide means to hold the individual fruit pieces at a pair of spaced points securely and against rotation, hydraulic-servo apparatus responsive to pressure changes in a portion thereof for varying the spacing of the cups of the first and second plurality from fruit piece to fruit piece as the fruit pieces pass within the cutting region so that for larger and smaller size fruit pieces the cups are spaced greater and lesser distances respectively from each other and each cup is uniformly spaced with respect to the cutting means so that fruit pieces are substantially centered relative thereto, adjustable means for controlling the operation of the hydraulic-servo apparatus with the adjustment of the sensing means controlled by the individual fruit pieces, valve mechanism included in the hydraulic-servo path, and means to control the degree of valve opening and closing following each change in the position of the sensing means thereby to establish a control of the pressure in a part of the hydraulic-servo apparatus.

12. The apparatus claimed in claim 11 comprising means adjacent to the path of movement of the fruit locating cups of each plurality of support the divided fruit sections adjacent to the cups subsequent to cutting for a portion of the cup travel path.

13. Fruit handling apparatus comprising a first plurality of serially positioned fruit locating cups each adapted to have one fruit piece located thereby, means to move the said plurality as a unit so that the individual cups successively pass a work point, cutting means located at the work point and adapted for cutting each fruit piece as moved by the fruit locating cups into half sections, a second plurality of fruit locating cups of a form similar to the first plurality of fruit locating cups, sensing means located adjacent to the motional path of the fruit locating cups and also adjacent to and ahead of the point of cutting for sensing the size of the fruit component to be cut, means to move the second set of fruit locating cups relative to the first locating cups and fruit adapted to be located thereby to contact the fruit immediately prior to and during the operation of the cutting means thereby to provide means to hold the individual fruit pieces at a pair of spaced points securely and against rotation, hydraulic-servo apparatus responsive to pressure changes in a portion thereof for varying the spacing of the cups of the first and second plurality from fruit piece to fruit piece as the fruit pieces pass within the cutting region so that for larger and smaller size fruit pieces the cups are spaced greater and lesser distances respectively from each other and each cup is uniformly spaced with respect to the cutting means so that fruit pieces are substantially centered relative thereto, adjustable means for controlling the operation of the hydraulic-servo apparatus with the adjustment of the sensing means controlled by the individual fruit pieces, valve mechanism included in the hydraulic-servo path, means to control the degree of valve opening and closing following each change in the position of the sensing means thereby to establish a control of the pressure in a part of the hydraulic-servo apparatus, and means to return the servo control mechanism to an equilibrium state immediately prior to each sensing measurement.

14. The apparatus claimed in claim 13 comprising, in addition, cam means operating concurrently with the movement of the fruit locating cups for releasing the valve mechanism for a return to a zero position prior to each testing operation.

15. Fruit handling apparatus comprising a conveyor means having its outer surface formed to include a plurality of uniformly spaced fruit locating cups each adapted to locate one fruit piece, means to move the conveyor past a cutting point, fruit cutting means located at the cutting point for dividing each fruit piece into two sections in one of which the pit is adapted to be retained, means provided by conveyor motion for shifting the fruit locating cups in sequence to positions adjacent to the cutting means, size sensing means adjacent to the conveyor and also adjacent to and ahead of the cutting point for sensing the size of each conveyor-carried fruit component to be cut, a drum, a second plurality of fruit locating cups of a form similar to the first plurality of fruit locating cups carried in alined formation on the drum periphery, means to rotate the drum to move the second set of fruit locating cups relative to the conveyor-moved first locating cups and any thereby located fruit to bring the cups of the second plurality into contact individually with a fruit piece located by the first plurality immediately prior to and during the operation of the cutting means thereby to provide means to hold the individual fruit pieces from spaced points securely and against rotation, servo apparatus for adjusting the spacing of the drum and conveyor and thereby the cups of the two pluralities relative to each other in the region of fruit contact and cutting so that for larger and smaller size fruit pieces respectively the conveyor and drum are spaced at a greater and lesser distance respectively from each other and each thereby carried cup is substantially equally spaced with respect to the cutting means, servo control means, and means for adjusting the servo control means subsequent to movement of each cup of each plurality past the cutting means and prior to the next cutting operation thereby to determine the separation of the drum and the conveyor under control of the sensing means.

16. The apparatus claimed in claim 15 comprising, in addition, means to hold each cut fruit piece half adjacent to its locating cup during cup movement in a region beyond the cutting point.

17. Fruit handling apparatus comprising a conveyor means having its outer surface formed to include a plurality of uniformly spaced fruit locating cups each adapted to locate one fruit piece, means to move the conveyor past a cutting point, fruit cutting means located at the cutting point for dividing each fruit piece into two sections in one of which the pit is adapted to be retained, means provided by conveyor motion for shifting the fruit locating cups in sequence to positions adjacent to the cutting means, size sensing means adjacent to the conveyor and also adjacent to and ahead of the cutting point for sensing the size of each conveyor-carried fruit component to be cut, a drum, a second plurality of fruit locating cups of a form similar to the first plurality of fruit locating cups carried in alined formation on the drum periphery, means to rotate the drum to move the second set of fruit locating cups relative to the conveyor-moved first locating cups and any thereby located fruit to bring the cups of the second plurality into contact individually with a fruit piece located by the first plurality immediately prior to and during the operation of the cutting means thereby to provide means to hold the individual fruit pieces from spaced points securely and against rotation, servo apparatus for adjusting the spacing of the drum and conveyor and thereby the cups of the two pluralities relative to each other in the region of fruit contact and cutting so that for larger and smaller size fruit pieces respectively the conveyor and drum are spaced at a greater and lesser distance respectively from each other and each thereby carried cup is substantially equally spaced with respect to the cutting means, servo control means, means for adjusting the servo control means subsequent to movement of each cup of each plurality past the cutting means and prior to the next cutting operation thereby to determine the separation of the drum and the conveyor under control of the sensing means, means to maintain each position of the servo control between adjustments, and means for returning the servo control to an equilibrium point immediately prior to each adjustment.

18. Fruit handling apparatus comprising a conveyor means having its outer surface formed to include a plurality of uniformly spaced fruit locating cups each adapted to locate one fruit piece, means to move the conveyor past a cutting point, fruit cutting means located at the cutting point for dividing each fruit piece into two sections in one of which the pit is adapted to be retained, means provided by conveyor motion for shifting the fruit locating cups in sequence to positions adjacent to the cutting means, a drum, a second plurality of fruit locating cups of a form similar to the first plurality of fruit locating cups carried in alined formation on the drum periphery, a fruit size sensing means secured to each cup on the drum adjacent to the conveyor and also adjacent to and ahead of the cutting point for sensing the size of each conveyor-carried fruit component to be cut, means to rotate the drum to move the second set of fruit locating cups relative to the conveyor-moved first locating cups and any thereby located fruit to bring the cups of the second plurality into contact individually with a fruit piece located by the first plurality immediately prior to and during the operation of the cutting means thereby to provide means to hold the individual fruit pieces from spaced points securely and against rotation, servo apparatus for adjusting the spacing of the drum and conveyor and thereby the cups of the two pluralities relative to each other in the region of fruit contact and cutting so that for larger and smaller size fruit pieces respectively the conveyor and drum are spaced at a greater and lesser distance respectively from each other and each thereby carried cup is substantially equally spaced with respect to the cutting means, servo control means, means controlled by the size sensing means secured to the cup adapted to locate the fruit piece next to be cut with conveyor advance for adjusting the servo control means subsequent to movement of each cup of each plurality past the cutting means and prior to the next cutting operation thereby to determine the separation of the drum and the conveyor under control of the sensing means.

19. Fruit handling apparatus comprising conveyor means having its outer surface formed to include a plurality of uniformly spaced fruit locating cups each adapted to locate one fruit piece, means to move the conveyor past a cutting point, fruit cutting means located at the cutting point for dividing each fruit piece into two sections in one of which the pit is adapted to be retained, means provided by conveyor motion for shifting the fruit locating cups in sequence to positions adjacent to the cutting means, size sensing means adjacent to the conveyor and also adjacent to and ahead of the cutting point for sensing the size of each conveyor-carried fruit component to be cut, a drum, a second plurality of fruit locating cups of a form complementary to the first plurality of fruit locating cups carried in alined formation of the drum periphery, means to rotate the drum to move the second set of fruit locating cups relative to the conveyor-moved first locating cups and any thereby located fruit to bring the cups of the second plurality into contact individually with a fruit piece located by the first plurality immediately prior to and during the operation of the cutting means thereby to provide means to hold the individual fruit pieces from spaced points securely and against rotation, and servo apparatus for adjusting the spacing of the drum and conveyor and thereby the cups of the two pluralities relative to each other in the region of fruit contact and cutting so that for larger and smaller size fruit pieces respectively the conveyor and drum are spaced at a greater and lesser distance respectively from each other and each thereby carried cup is substantially equally spaced with respect to the cutting means.

20. Fruit handling apparatus comprising conveyor means having its outer surface formed to include a plurality of uniformly spaced fruit locating cups each adapted to locate one fruit piece, means to move the conveyor past a cutting point at a substantially uniform rate, fruit cutting means located at the cutting point at opposite sides of the conveyor for dividing each fruit piece into two sections in one of which the pit is adapted to be retained, means provided by conveyor motion for shifting the fruit locating cups in sequence to positions adjacent to the cutting means, size sensing means adjacent to the conveyor and also adjacent to and ahead of the cutting point for sensing the size of each conveyor-carried fruit component to be cut, a drum, a second plurality of fruit locating cups of a form similar to the first plurality of fruit locating cups carried in alined formation of the drum periphery, means to rotate the drum to move the second set of fruit locating cups relative to the conveyor-moved first locating cups to bring the cups of the second set to locations approaching tangency to the conveyor and any thereby located fruit at the cutting point and to bring the cups of the second plurality into contact individually with a fruit piece located by the first plurality immediately prior to and during the operation of the cutting means thereby to provide means to hold the individual fruit pieces from spaced points securely and against rotation, and servo apparatus for adjusting the spacing of the drum and conveyor and thereby the cups of the two pluralities relative to each other in the region of fruit contact and cutting so that for larger and smaller size fruit pieces the conveyor and drum are spaced at a greater and lesser distance respectively from each other and each thereby carried cup is substantially equally spaced with respect to the cutting means.

21. Fruit handling apparatus comprising conveyor means having its outer surface formed to include a plurality of uniformly spaced fruit locating cups each adapted to locate one fruit piece, means to move the conveyor and the cups secured thereto past a cutting point at a substantially uniform rate, fruit cutting means located at the cutting point for dividing each fruit piece into two sections in one of which the pit is adapted to be retained, a drum supported adjacent to the conveyor, a second plurality of fruit locating cups of a form similar to the first plurality of fruit locating cups carried in alined formation of the drum periphery, means to rotate the drum to move the second set of fruit locating cups relative to the conveyor-moved first locating cups and any thereby located fruit to bring the cups of the second plurality into contact individually with a fruit piece located by the first plurality immediately prior to and during the operation of the cutting means thereby to provide means to hold the individual fruit pieces from spaced points securely and against rotation, size sensing means associated with each cup and adapted with drum rotation to be positioned adjacent to the conveyor and also adjacent to and ahead of the cutting point for sensing the size of each conveyor-carried fruit component to be cut, servo apparatus for adjusting the spacing of the drum and conveyor and thereby the cups of the two pluralities relative to each other in the region of fruit contact and cutting so that for larger and smaller size fruit pieces respectively the conveyor and drum are spaced at a greater and lesser distance respectively from each other and each thereby carried cup is substantially equally spaced with respect to the cutting means, and means controlled by the size sensing means at a time prior to cutting to control the servo means.

22. The apparatus claimed in claim 21 comprising, in addition, cam means operating concurrently with the movement of the fruit locating cups for releasing the valve mechanism for a return to a zero position prior to each testing operation.

23. Fruit handling apparatus comprising a conveyor, a first plurality of fruit locating cups each adapted to locate one fruit piece carried by the conveyor, means to move the conveyor and the supported cups past a work point, a drum positioned adjacent to the conveyor at substantially the work point, a second plurality of fruit locating cups of similar form supported upon the drum periphery, means to rotate the drum to move the second plurality of fruit locating cups relative to the first plurality of fruit locating cups at approximately the conveyor speed at the work point and in the same direction so that the cups on the drum periphery individually contact fruit pieces located by the first plurality of cups and also establish substantially full contact immediately prior to and subsequent thereto, thereby to provide means to hold individual fruit pieces from spaced apart regions securely and against rotation, size sensing means carried by each drum-supported cup to sense the fruit size adjacent to the motional path of the conveyor-supported fruit locating cups and also adjacent to and ahead of the work point, means automatically responsive to said sensing means for adjusting the relative spacings between the conveyor and the drum continually with the movement of each fruit piece past the work point so as to accommodate in sequence random size fruits and to maintain the work point substantially midway between the outer edges of spaced conveyor and drum fruit supporting cups, a pair of generally arcuately shaped cutting elements supported generally at the work point on opposite sides of each of the plurality of fruit locating cups and adapted for rotational movement in a plane substantially midway between the fruit supporting cups at the work point, and means for resiliently biasing the cutting means relative to each other so as to bring them into abutting engagement with each other at a point immediately behind the work point and whereby movement of the fruit supported against rotation by the fruit locating cups of the first and second plurality brings the fruit into engagement with the arcuate cutting edge of the cutting means and forces limited separation of the cutting means during passage of the fruit pieces adjacent thereto and thereby divides the fruit pieces in sequence into fruit half-sections.

24. Apparatus for dividing fruit pieces into half-sections comprising a plurality of substantially similar fruit locating cups arranged in two series, means for gravitationally supporting individual fruit pieces upon the fruit supporting cups of one series, means for moving the so-supported fruit pieces past a work point whereat the fruit pieces are adapted to be divided into half-sections, means for moving the second series of fruit locating cups also past the work point and for contacting the fruit surface opposite that supported by the cups of the first series ahead of the work point as the fruit is moved thereto and for maintaining the contact to a region behind the work point, means for sensing the size of each gravitationally supported fruit piece section at a time prior to its being moved to the work point, means controlled by the sensing means for spacing the fruit supporting and locating cups of each series at the work point so that the supported and located fruit pieces are presented with substantially the central plane of each supported fruit piece without regard to fruit size passing through the work point, a pair of generally arcuately shaped cutting blades located at approximately the work point, means for resiliently biasing the cutting blades to substantially abutting engagement in the absence of any fruit pieces present at the work point and so that fruit pieces arriving at the work point engage the cutting edges of the blades to permit cutting of the fruit skin and flesh inwardly to the pit and for permitting the pit to displace the blades and rotate them against the resilient force in a plane substantially coinciding with the mid-plane of the supported fruit pieces so that the fruit pieces are divided into half-sections in the region of the work point by a cutting action effective from opposite sides of the fruit with a single cut produced between the initial contact between the front region of the supported fruit piece and the last contact point at the rear of each supported fruit piece as it is moved relative to the work point.

25. Fruit handling apparatus comprising a plurality of fruit locating cups adapted to be moved to pass in sequence relative to a work point and each adapted to support and to have one piece of fruit located thereby, means adjacent to the motional path of the fruit locating cups and also adjacent to and ahead of the work point for sensing the size of the fruit component carried by each cup, a second plurality of similar fruit locating cups inverted in relation to the first plurality of fruit locating cups, means to move the second set of fruit locating cups to cause them to travel at the work point in substantially the same direction as the first set of fruit locating cups and the fruit adapted to be held and located thereby so as to contact and locate the fruit at a region opposite that by which it is located by the first fruit locating cups and at a time immediately prior to and during its movement past the work point thereby to provide a means to hold the individual fruit pieces from regions above and below the mid-section securely and against rotation, servo apparatus responsive to pressure changes in a portion thereof for adjusting the spacing of the cups of the first and second plurality proportionally to the size of the instantaneously located fruit pieces within the work region so that for larger and smaller size fruit pieces the cups of the first and second plurality are spaced greater and lesser distances respectively from each other and so that the cups of each plurality are uniformly spaced with respect to the work point in order that the mid-section of fruit pieces supported by the cups may pass substantially adjacent to the work point with fruit piece movement independently of fruit piece size, means for controlling the operation of the servo apparatus with adjustment of the sensing means controlled by the individual fruit pieces, a pair of generally arcuately shaped cutting elements supported at the work point on opposite sides of each of the plurality of fruit locating cups and adapted for rotational movement in a plane substantially midway between the fruit supporting cups at the work point, and means for resiliently biasing the cutting means relative to each other so as normally to hold them in abutting engagement with each other at a point immediately behind the work point and permit movement of the fruit, supported against rotation by the fruit locating cups of the first and second plurality, to engage the arcuate cutting edge of the cutting means and to force the said cutting means apart while cutting the fruit skin and flesh inwardly to the pit during passage of the fruit adjacent thereto thereby to divide the fruit pieces in sequence into fruit half-sections.

References Cited in the file of this patent

UNITED STATES PATENTS

| | | |
|---|---|---|
| 2,514,120 | Chenette | July 4, 1950 |
| 2,525,245 | Stroeve | Oct. 10, 1950 |
| 2,675,843 | Jarvis | April 20, 1954 |
| 2,735,465 | Kellogg | Feb. 21, 1956 |

UNITED STATES PATENT OFFICE
CERTIFICATE OF CORRECTION

Patent No. 2,858,863                                           November 4, 1958

Coby Lorenzen

It is hereby certified that error appears in the printed specification of the above numbered patent requiring correction and that the said Letters Patent should read as corrected below.

Column 7, line 33, for "Figs. 1. and 2," read -- Figs. 1 and 2, --; column 12, line 53, for "cups an" read -- cups in --; column 15, line 68, for "plurality of" read -- plurality to --; column 22, line 2, before "adjacent" insert -- pieces --.

Signed and sealed this 26th day of May 1959.

(SEAL)

Attest:

KARL H. AXLINE                                                     ROBERT C. WATSON

Attesting Officer                                            Commissioner of Patents